United States Patent
Steger et al.

(10) Patent No.: US 6,261,085 B1
(45) Date of Patent: Jul. 17, 2001

(54) TANDEM INJECTION MOLDING APPARATUS AND PRESS THEREFOR

(75) Inventors: Rudy Steger, King City; Daniel Meidan, Thornhill, both of (CA)

(73) Assignee: Reena Corporation, Downsview (CA)

( * ) Notice: Subject to any disclaimer, the term of this patent is extended or adjusted under 35 U.S.C. 154(b) by 0 days.

(21) Appl. No.: 09/298,830

(22) Filed: Apr. 26, 1999

Related U.S. Application Data (63) Continuation-in-part of application No. 09/100,861, filed on Jun. 22, 1998, now abandoned.

(51) Int. Cl.[7] .................................................. B29C 45/64
(52) U.S. Cl. ..................... 425/588; 338/451.2; 338/590
(58) Field of Search .................................. 425/588, 589, 425/590, 595, 338, 450.1, 451.2, 451.9

(56) References Cited

U.S. PATENT DOCUMENTS

| | | |
|---|---|---|
| 2,161,588 | 6/1939 | Piperoux . |
| 2,259,781 | 10/1941 | Shaw et al. . |
| 2,273,516 | 2/1942 | Dinzl . |
| 2,333,059 | 10/1943 | Tucker . |
| 2,555,476 | 6/1951 | Du Bois et al. . |
| 3,015,849 | 1/1962 | Mittelstadt et al. . |
| 3,642,407 | 2/1972 | Fischbach . |
| 3,669,593 | 6/1972 | Cyriax ................................. 425/186 |
| 4,021,181 | 5/1977 | Hehl ................................. 425/450.1 |
| 4,090,837 * | 5/1978 | Balevski et al. ..................... 425/588 |
| 4,105,385 | 8/1978 | Hehl ................................. 425/192 R |
| 4,571,169 | 2/1986 | Shima et al. ....................... 425/451.9 |
| 4,668,178 | 5/1987 | Hehl ..................................... 425/589 |
| 4,747,982 | 5/1988 | Nakatsukasa et al. .............. 264/40.5 |
| 4,753,592 * | 6/1988 | Kaaden ................................ 425/588 |
| 4,867,938 * | 9/1989 | Schad et al. ........................ 425/588 |
| 5,324,192 * | 6/1994 | Zakich ................................. 425/588 |
| 5,714,180 * | 2/1998 | Lampl et al. ........................ 425/589 |
| 5,928,684 * | 7/1999 | Glaesener et al. ................... 425/589 |

* cited by examiner

*Primary Examiner*—James P. Mackey
(74) *Attorney, Agent, or Firm*—Dimock Stratton Clarizio; Mark B. Eisen (57) ABSTRACT

A tandem press has a moving frame comprising a moving platen moving in a reciprocating motion between stationary outer platens, between a first clamping position in which the moving platen clamps a first mold mounted on one side of the press, and a second clamping position in which the moving platen clamps a second mold on the other side of the press. The tandem press of the invention thus provides two complete clamping cycles within one press cycle. In the preferred embodiment the hydraulic pistons actuating the moving platen also serve as guide bars for maintaining the moving platen in alignment with the stationary platens. In the preferred embodiment the actuating cylinders are small bore diameter high speed cylinders, and the moving platen is provided with larger bore diameter hydraulic clamping cylinders to apply the required clamping force to the mold after the actuating cylinders have moved the moving platen to the clamping position.

14 Claims, 12 Drawing Sheets

TANDEM INJECTION MOLDING APPARATUS AND PRESS THEREFOR

CROSS-REFERENCE TO RELATED APPLICATIONS

This application is a continuation-in-part of application Ser. No. 09/100,861, filed Jun. 22, 1998, now abandoned.

FIELD OF THE INVENTION

This invention relates to presses. In particular, this invention relates to a press particularly suitable for use with an injection or extrusion molding apparatus, and a molding apparatus utilizing the press.

BACKGROUND OF THE INVENTION

Presses have many uses, one of the most popular being to clamp mold parts together in an injection molding apparatus. In a conventional injection molding apparatus a press section is disposed behind a plastic injection section. The press includes a moving platen which is forced toward a stationary platen by at least one actuator, usually a hydraulic cylinder mounted at the rear of the apparatus. The actuator bears against a stationary rear frame or "spider", which supports upper and lower pairs of guide bars that maintain the moving and stationary platens (and thus the mold parts) in precise alignment as the actuator forces the moving platen toward the stationary platen and into the clamping position.

Typically a hydraulic press is used in an injection molding apparatus, due to the very high forces required to properly clamp the mold parts together. In a conventional hydraulic actuator the hydraulic cylinder must be longer than the length of a full stroke of the piston and must be oriented in the direction of the stroke. Since the injection molding apparatus occupies the space in front of the press, the hydraulic cylinder is conventionally mounted to the rear of the press and thus a large clearance is required behind the operative clamping portion of the press in order to accommodate the cylinder.

Moreover, in a conventional hydraulic press the hydraulic cylinder serves the sole purpose of actuating the moving platen, and separate guide bars are used to maintain the moving and stationary platens in precise alignment. The use of separate structures for these purposes results in an expensive and heavy apparatus which makes poor use of available space.

It would accordingly be advantageous to provide a hydraulic press in which the actuating cylinders can be reduced in length and contained within the operative clamping section of the press, to significantly reduce the space requirements of the overall apparatus and thus allow plastics fabricators to utilize production facilities more efficiently.

It would also be advantageous to provide a press which combines the actuating and platen alignment functions of the press into the same structure, to reduce the weight and cost of the apparatus.

It would also be advantageous to provide a press that operates in two directions, taking advantage of the reciprocating motion of the actuator, to provide two injection molding cycles within a single press cycle.

SUMMARY OF THE INVENTION

The present invention overcomes these disadvantages and provides an economical, lightweight and compact press and injection molding apparatus utilizing the press. The press of the invention may be used in virtually any application in which a conventional hydraulic press may be used, the press of the invention being particularly advantageously used with injection molding units in an injection molding apparatus.

The invention accomplishes this by providing a tandem press having a moving frame comprising a moving platen moving in a reciprocating motion between stationary outer platens. The moving platen moves on a track between a first clamping position in which the moving platen clamps a first mold mounted on one side of the press, and a second clamping position in which the moving platen clamps a second mold on the other side of the press. Because of the tandem design, as one mold is moved to a clamping position the other mold is being separated to remove a molded article. The tandem press of the invention thus provides two complete clamping cycles within one press cycle.

In the preferred embodiment the hydraulic pistons actuating the moving platen also serve as guide bars for maintaining the moving platen in alignment with the stationary platens. The tandem press of the invention thus avoids the need for separate guide bars by providing hydraulic actuating cylinders mounted on the stationary platens, the pistons for which serve both as guide bars to maintain alignment between the platens and as actuators to move the moving platen between clamping positions. In the preferred embodiment the actuating cylinders operate at a relatively low pressure and high speed, and the moving platen is provided with hydraulic clamping cylinders operating at relatively high pressure to apply the required clamping force to the mold after the actuating cylinders have moved the moving platen to the clamping position.

The present invention thus provides press, comprising a stationary frame comprising a first stationary platen having a working face and a second stationary platen having a working face, disposed in opposition to the first stationary platen, and a moving frame comprising a moving platen disposed between the first and second stationary platens and in alignment therewith, having a first working face in opposition to the working face of the first stationary platen and a second working face in opposition to the working face of the second stationary platen, movable between the first and second stationary platens so as to alternately apply a clamping force to the working face of the first stationary platen and to the working face of the second stationary platen, and an actuator for moving the moving platen between the first and second stationary platens.

BRIEF DESCRIPTION OF THE DRAWINGS

In drawings which illustrate by way of example only a preferred embodiment of the invention.

DETAILED DESCRIPTION OF THE INVENTION

Figure 1:
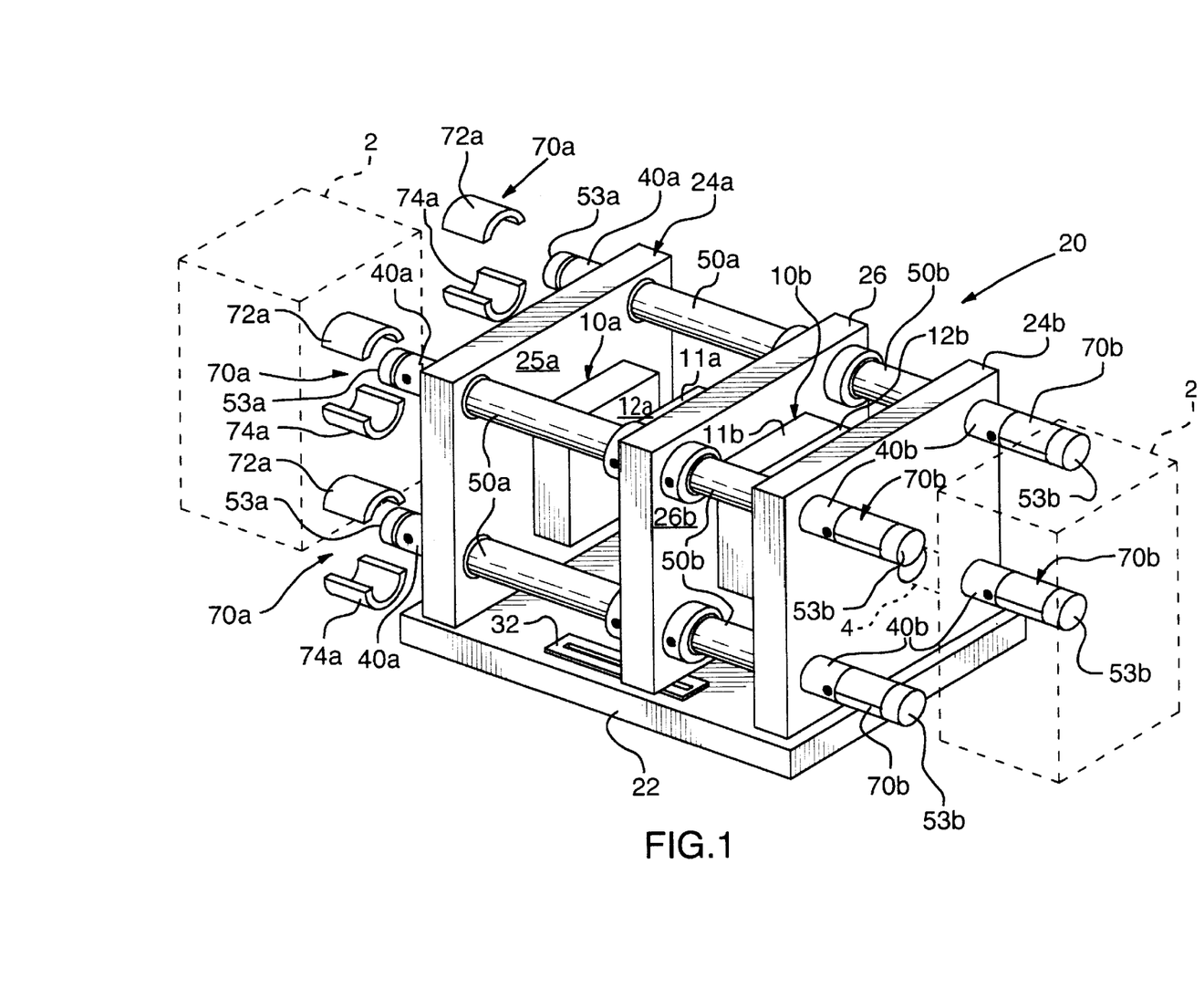
FIG. 1 is a perspective view of an injection molding apparatus embodying a hydraulic press of the invention.

FIG. 1 illustrates an injection molding apparatus utilizing a preferred embodiment of the press 20 of the invention. The injection molding units 2 shown in FIG. 1 are entirely conventional, having an injector pump (not shown) for pressurizing a molten thermoplastic material through a screw/runner 4 for injecting the molten thermoplastic into a mold, and an ejector pin and platen (not shown) for ejecting the molded article from the mold. The operation and structural details of the injection molding units 2 will be well known to those skilled in the art, and the invention is not intended to be limited to use with any particular type or configuration of injection molding unit 2.

The invention resides in a novel press 20, illustrated in detail in FIGS. 1 to 5B. The press 20 of the invention is described in relation to a hydraulic press embodiment, which provides certain advantages that will become apparent from the description below. However, it will be appreciated by those skilled in the art that the press 20 of the invention utilizing other types of actuators, for example electric motor or screw-type actuators, may also be suitable.

In the preferred embodiment illustrated, the press 20 is preferably supported on a base or pad 22, and includes a stationary frame and a moving frame. The press 20 is preferably laterally symmetrical and provides two molds 10a, 10b each respectively comprising mold parts 11a, 12a and 11b, 12b. Mold 10a is mounted into one side of the press 20, and mold 10b is mounted into the other side of the press 20. An injection molding apparatus 2 (shown schematically in phantom lines in FIG. 1) is preferably disposed at each end of the press 20 to inject plastic into the molds 10a, 10b in conventional fashion. It will be appreciated that the press 20 of the invention could also be operated with a single injection molding apparatus operating with a single mold 10a or 10b, however there are benefits to operating the press 20 in tandem fashion to obtain two clamping cycles (i.e. injection molding cycles) within a single press cycle as described in the preferred embodiment.

The stationary frame comprises a first stationary platen 24a having a working face 25a and a second stationary platen 24b having a working face 25b disposed in opposition to the working face 25a. The moving frame comprises a moving platen 26 disposed between the stationary outer platens 24a, 24b, having a first working face 26a and a second working face 26b on the opposite side thereof. The moving platen 26 is mounted on a track 32 and moves between two clamping positions, a first clamping position in which the moving platen 26 compressively clamps mold part 11a mounted on face 26a of the moving platen 26 against a mating mold part 12a mounted on the working face 25a of the first stationary platen 24a, and a second clamping position in which the moving platen 26 compressively clamps mold part 11b mounted on the opposite face 26b of the moving platen 26 against mating mold part 12b mounted on the working face 25b of the second stationary platen 24b. Because of the tandem design, as the mold part 11b is moved toward a clamping position against mold part 12b mold part 11a is separated from mold part 12a, and vice versa. In the preferred embodiment the press 20 thus provides two complete clamping cycles in one press cycle.

In the preferred embodiment of the press 20 of the invention hydraulic pistons 50a, 50b respectively actuated by hydraulic cylinders 40a, 40b serve to transfer the actuating force of the hydraulic fluid to the moving platen 26. The pistons 50a also act as guide bars to maintain the platens 24a and 26 in alignment during the process of clamping mold parts 11a and 12a; likewise, the pistons 50b act as guide bars to maintain the platens 24b and 26 in alignment during the process of clamping mold parts 11b and 12b.

In the preferred embodiment, to the outer face of each stationary platen 24a, 24b are respectively mounted four hydraulic cylinders 40a, 40b, preferably generally evenly spaced about the axial center of the press 20. The cylinders 40a, 40b are bolted to the stationary platens 24a, 24b as by bolts 41. Each cylinder 40a, 40b has a length slightly greater than the stroke length of the pistons 50a, 50b, as defined by the length of the path of travel of the moving platen 26 along the track 32.

The hydraulic actuating cylinders 40a, 40b are provided at each end with an inner and outer head assembly 42a, 44a and 42b, 44b, respectively, provided with suitable bearings and seals. The outer head assembly 44a or 44b provides an hydraulic port 46a or 46b for pumping hydraulic fluid into and out of the cylinders 40a, 40b. The piston 50a or 50b is slidably mounted within each cylinder 40a or 40b, respectively. (For ease of reference like parts on each side of the press 20 are referred to herein using like reference numerals, with the suffix "a" to designate parts on the side of the press 20 containing mold 10a, shown at the left in the drawings, and with the suffix "b" to designate parts on the side of the press 20 containing mold 10b, shown at the right in the drawings.)

Figure 2:
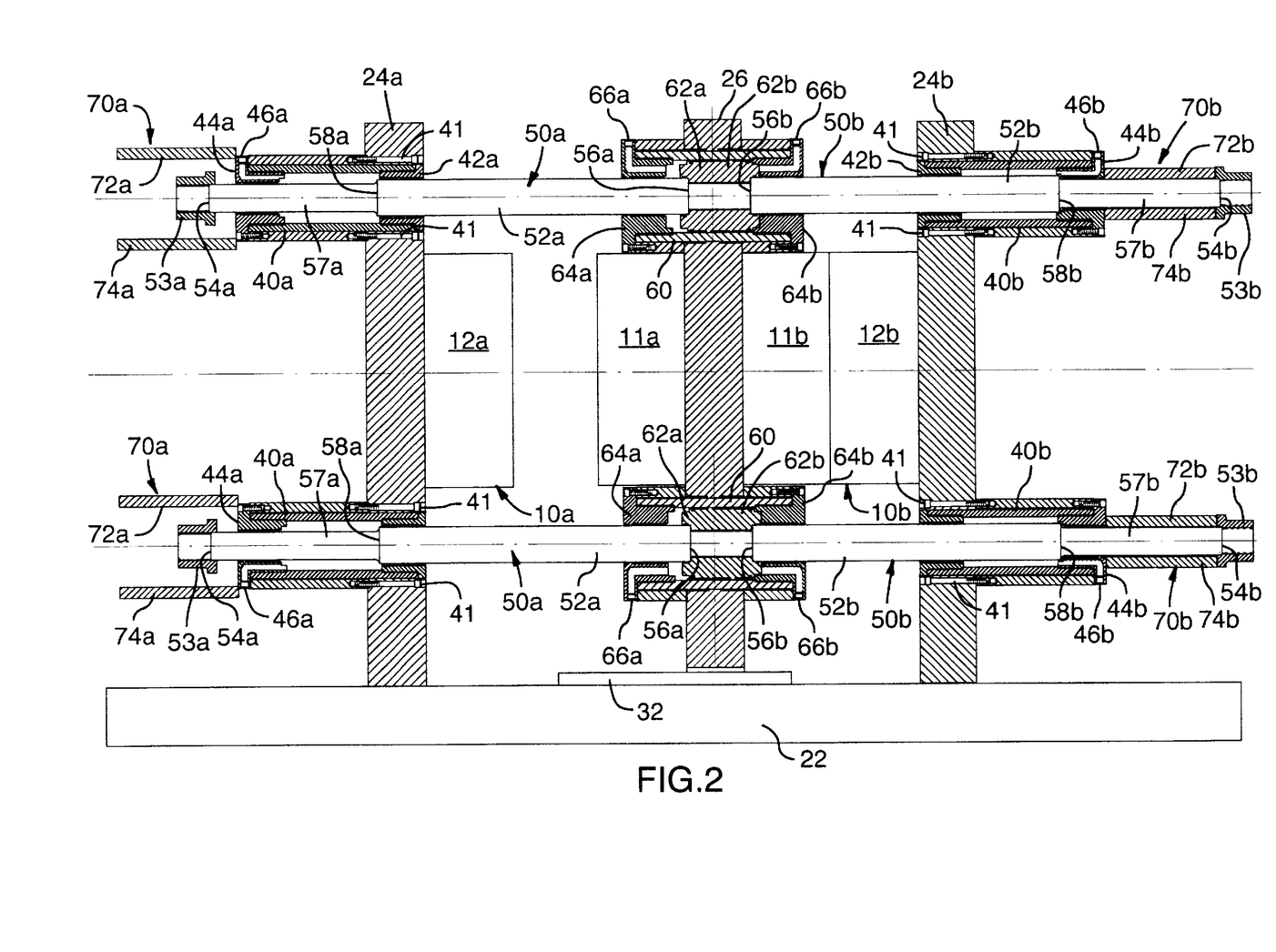
FIG. 2 is a cross-sectional elevation of the press of the invention illustrated in the injection molding apparatus of FIG. 1, FIGS. 3A to 3F are cross-sectional elevations of the press of FIG. 2 showing the stages of operation of the press section.
Figure 3A:
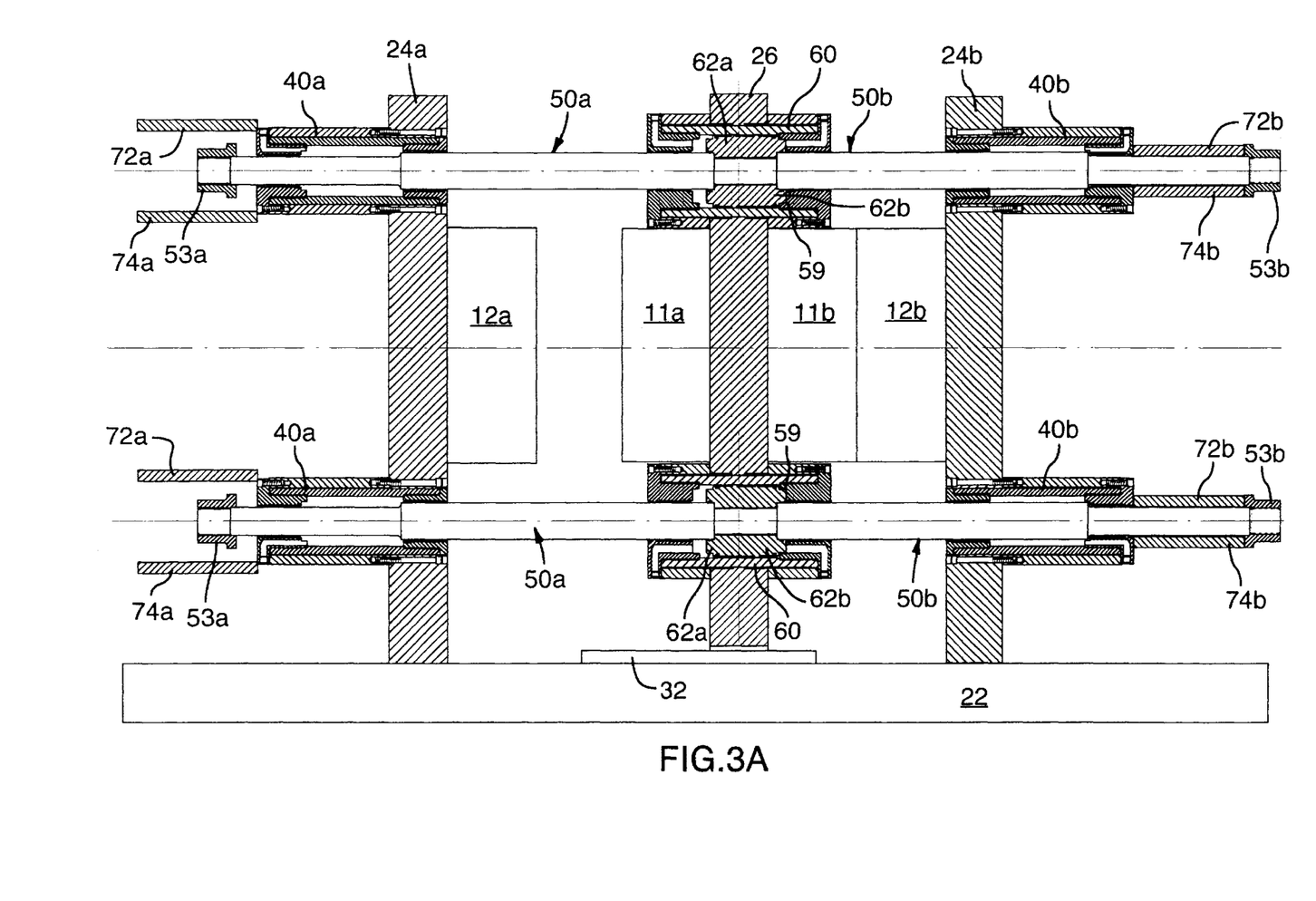

Each piston 50a comprises a piston rod 52a which extends out of the outer head assembly 44a to an outer end 54a, and extends through the inner head assembly 42a to a clamping end 56a which is secured to the moving platen 26 in the manner hereinafter described. The hydraulic head assemblies 42a and 44a retain hydraulic fluid within the cylinder 40a while the piston rod 52a slides through the cylinder 40a to actuate the moving platen 26. The pistons 50a thus move between a retracted position in which the mold 10a is closed and the mold 10b is fully open, and an extended position in which the mold 10b is closed and the mold 10a is fully open as shown in FIGS. 2 and 3A.

Likewise, each piston 50b comprises a piston rod 52b extends out of the outer head assembly 44b to an outer end 54b, and extends through the inner head assembly 42b to a clamping end 56b which is secured to the moving platen 26 in the manner hereinafter described. The pistons 50b thus move between a retracted position in which the mold 10b is closed and the mold 10a is fully open and an extended position in which the mold 10a is closed and the mold 10b is fully open as shown in FIG. 3E.

The moving platen 26 is thus actuated along a path of travel defined by the track 32 by the piston rods 52a, 52b, which in turn are driven by hydraulic fluid pumped into and out of the hydraulic actuating cylinders 40a, 40b during a press cycle. In the preferred embodiment each of the piston rods 52a, 52b respectively comprises a constricted portion 57a, 57b which provides a bearing surface 58a, 58b where the diameter of the piston rod 52a, 52b increases. The bearing surface 58a or 58b is disposed within the respective hydraulic cylinder 40a or 40b and acts as a piston head; as hydraulic fluid is pumped into the cylinder 40a or 40b the pressure on the bearing surface 58a or 58b displaces the respective piston rod 52a or 52b toward the moving platen 26.

This avoids the need for a separate piston head within the cylinder 40a or 40b, with attendant cost advantages, and is sufficient for the relatively low driving force required to move the moving platen 26 to the clamping position. In the preferred embodiment a much higher clamping force required is provided by hydraulic clamping cylinders 60, described below. An embodiment of the invention actuated and clamped solely by the hydraulic actuating cylinders 40a, 40b is also feasible, in which case the cylinders 40a, 40b would also have to operate at the higher clamping force required to clamp the molds 10a, 10b; in this case the piston rods 52a, 52b could each be provided with a separate piston head disposed within the actuating cylinders 40a, 40b to provide the required clamping force, however it is expected that the duration of the press cycle would be considerably increased in this embodiment.

As noted above, in the preferred embodiment the hydraulic actuating cylinders 40a, 40b are small bore diameter high speed cylinders that are used only to move the moving platen 26 to the clamping positions. The clamping force is supplied by hydraulic clamping cylinders 60 mounted on the moving platen 26, which have a relatively larger bore diameter and thus provide a higher force than the actuating cylinders 40a, 40b. The inner ends 56a, 56b of the piston rods 52a, 52b are disposed through sealing flanges 64a, 64b and affixed to piston heads 62a, 62b which may be secured together (or formed as a single piston head 62) slidably contained within the cylinder 60. The purpose of the cylinders 60 is to apply a high clamping force between the mold parts 11a, 12a or 11b, 12b in the final stage of the clamping cycle, and thus the clamping cylinders 60 are provided with a larger cross-section than the actuating cylinders 40a, 40b, and the piston heads 62a, 62b provide a commensurately larger surface area against which the hydraulic fluid acts to produce the greater clamping force. The cylinder 60 is mounted into the moving platen 26 and provides hydraulic ports 66a, 66b, respectively, for alternately actuating the piston heads 62a, 62b as the moving platen 26 reaches the alternate clamping positions.

The outer end of each hydraulic actuating cylinder 40a or 40b is provided with a movable spacer, in the preferred embodiment an anchoring yoke 70a or 70b, the purpose of which is to anchor the pistons 50a, 50b into the retracted position during the final stage of a clamping cycle. The outer ends 54a, 54b of the piston rods 52a, 52b are provided with an enlargement, for example anchoring caps 53a, 53b threadedly engaged to the outer ends 54a, 54b of the piston rods 52a, 52b as in the embodiment shown.

The yokes 70a, 70b each preferably comprise curved or hemi-cylindrical portions 72a, 74a and 72b, 74b, respectively, which are actuated by any suitable actuator 80 such as a solenoid, or by any other suitable alternative such as a motor, pneumatic or hydraulic actuator or the like. In the preferred embodiment the actuator 80 actuates a reciprocating frame 81 comprising connecting rods 82 joined by crossbars 84, as shown in FIG. 6 (the actuator 80 and frame 81 have been omitted from FIGS. 1 to 5 for clarity). The frame 81 moves the yokes 70a, 70b between an anchoring position in which the yoke 70a or 70b is engaged about the piston rod 52a or 52b, respectively, and thus impinges into the path of the anchoring cap 53a or 53b to serve as a spacer which maintains the anchoring cap 53a or 53b at a fixed spacing from the hydraulic actuating cylinder 40a or 40b to anchor the piston 50a or 50b in the retracted position; and a release position in which the yoke 70a or 70b is released from the piston rod 52a or 52b and the anchoring cap 53a or 53b is free to move toward the hydraulic cylinder 40a or 40b so that the piston 50a or 50b can be driven to the extended position. For example, on the left-hand side of FIG. 6 the yokes 70a are shown in the anchoring position and on the right-hand side of FIG. 6 the yokes 70a are shown in the release position.

It will be appreciated that although the releasable spacer in the preferred embodiment comprises a yoke 70a or 70b, the spacer functions to space the anchoring cap 53a or 53b from the cylinder 40a or 40b, respectively, and this can be accomplished by any other suitable means. Further, the manner in which yokes 70a, 70b are moved between the anchoring position and the release position can be achieved many other ways, and the invention is not intended to be limited in this respect.

The operation of the tandem embodiment of the press 20 of the invention will now be described with reference to the preferred embodiment illustrated, and particularly FIGS. 3A to 3F which show the various stages in one complete press cycle (two clamping cycles).

FIG. 3A shows the press 20 with the mold 10b in a fully clamped condition and the mold 10a in a fully separated condition. The clamping cylinders 60 are fully actuated to apply pressure against piston head 62b, and thus tension the piston 50b to provide the required clamping force between mold parts 11b and 12b. A previously molded plastic article is being removed from separated mold parts 11a and 12a.

Figure 3B:
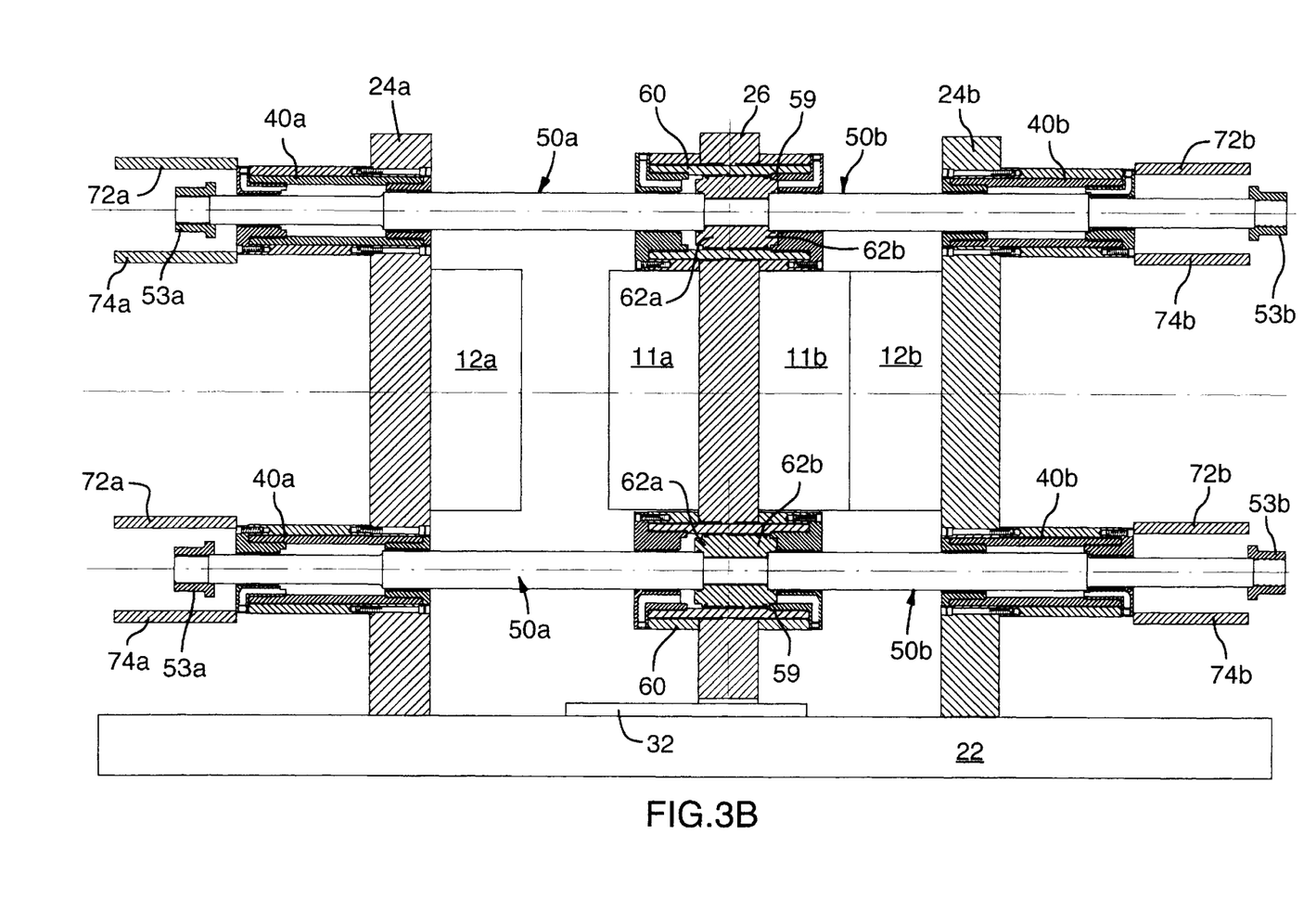
Figure 3C:
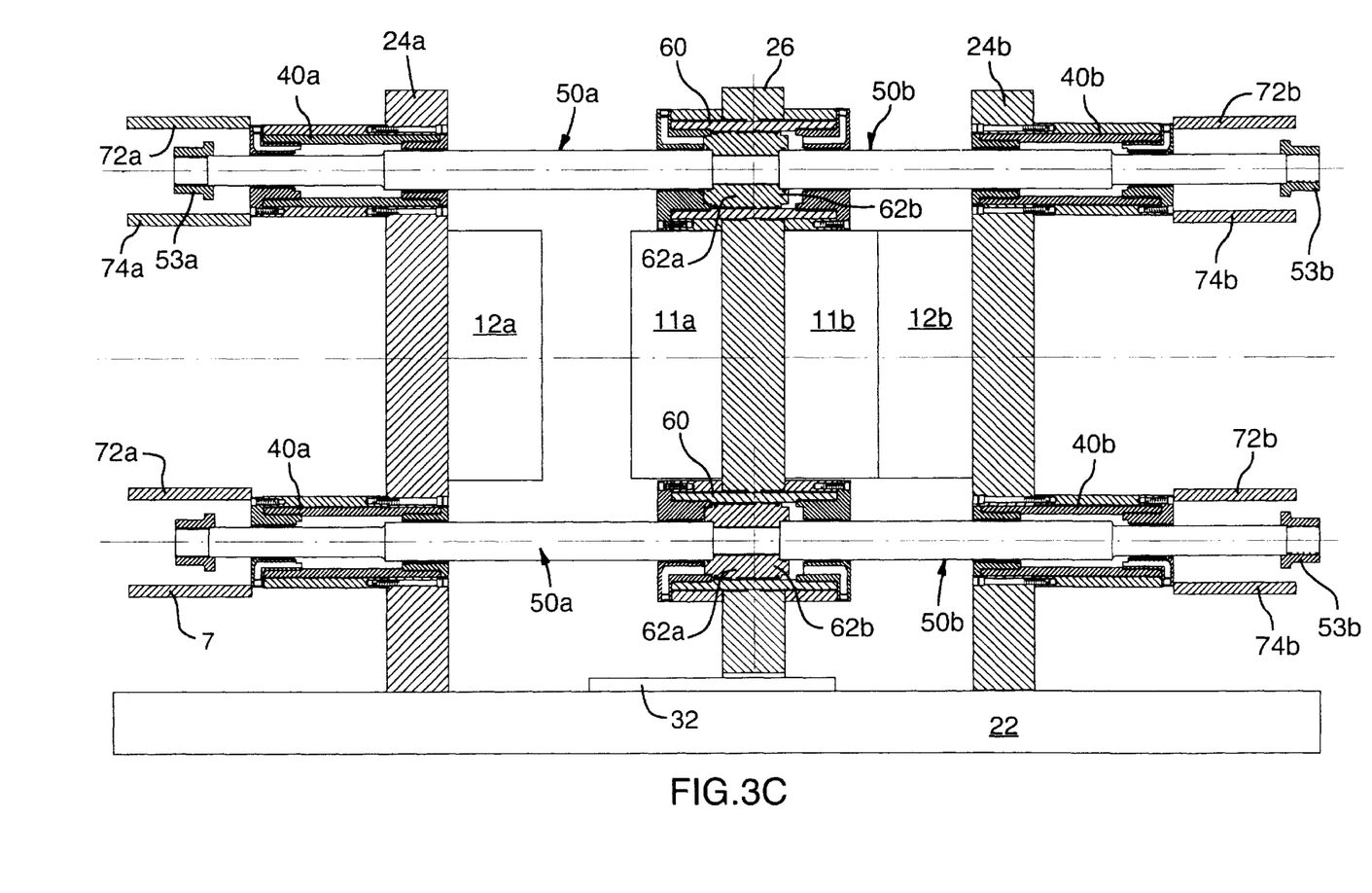
Figure 5A:
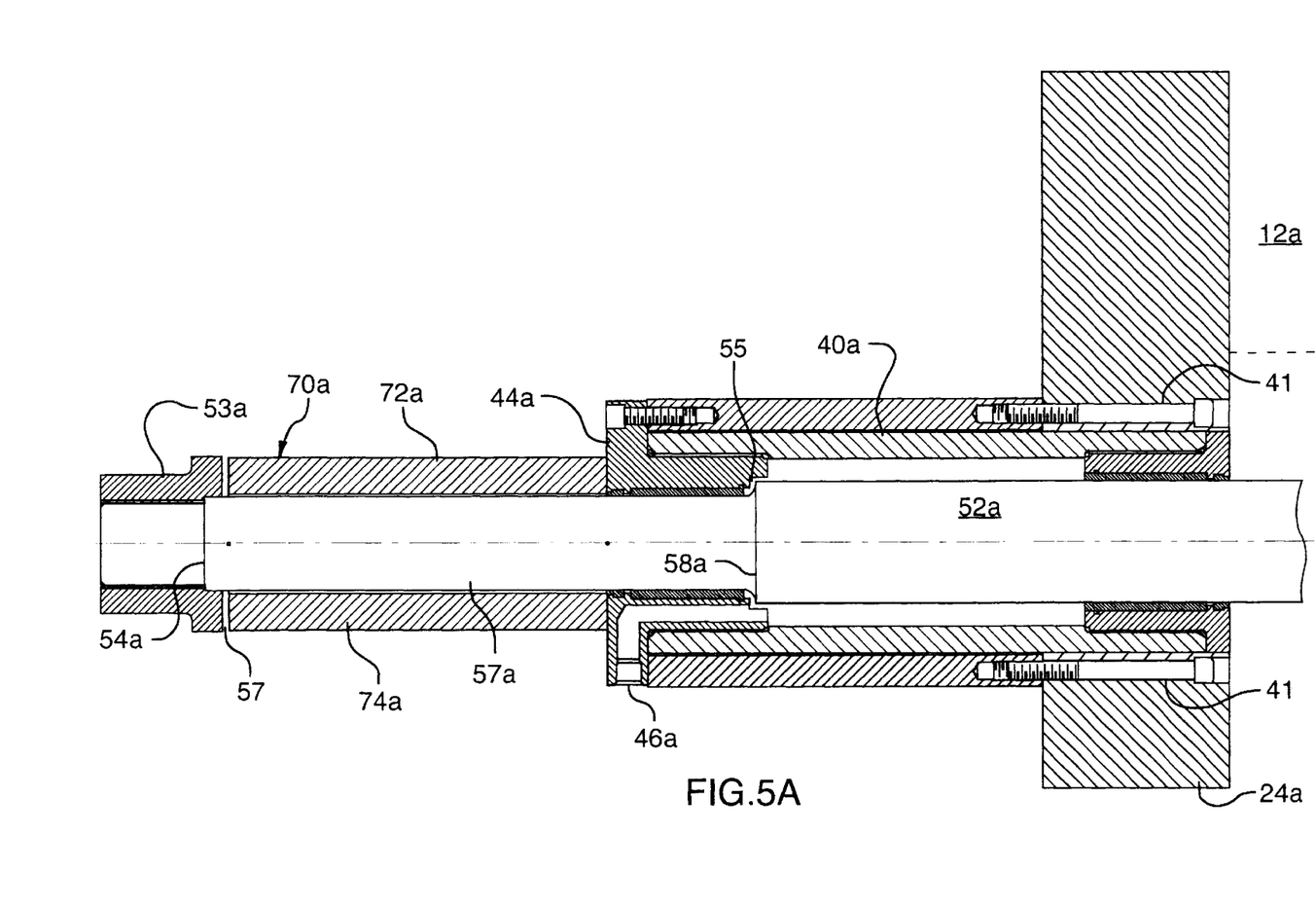
FIG. 5A is a cross-section of an anchoring yoke in the press of FIG. 2 showing the yoke in the anchoring position.
Figure 5B:
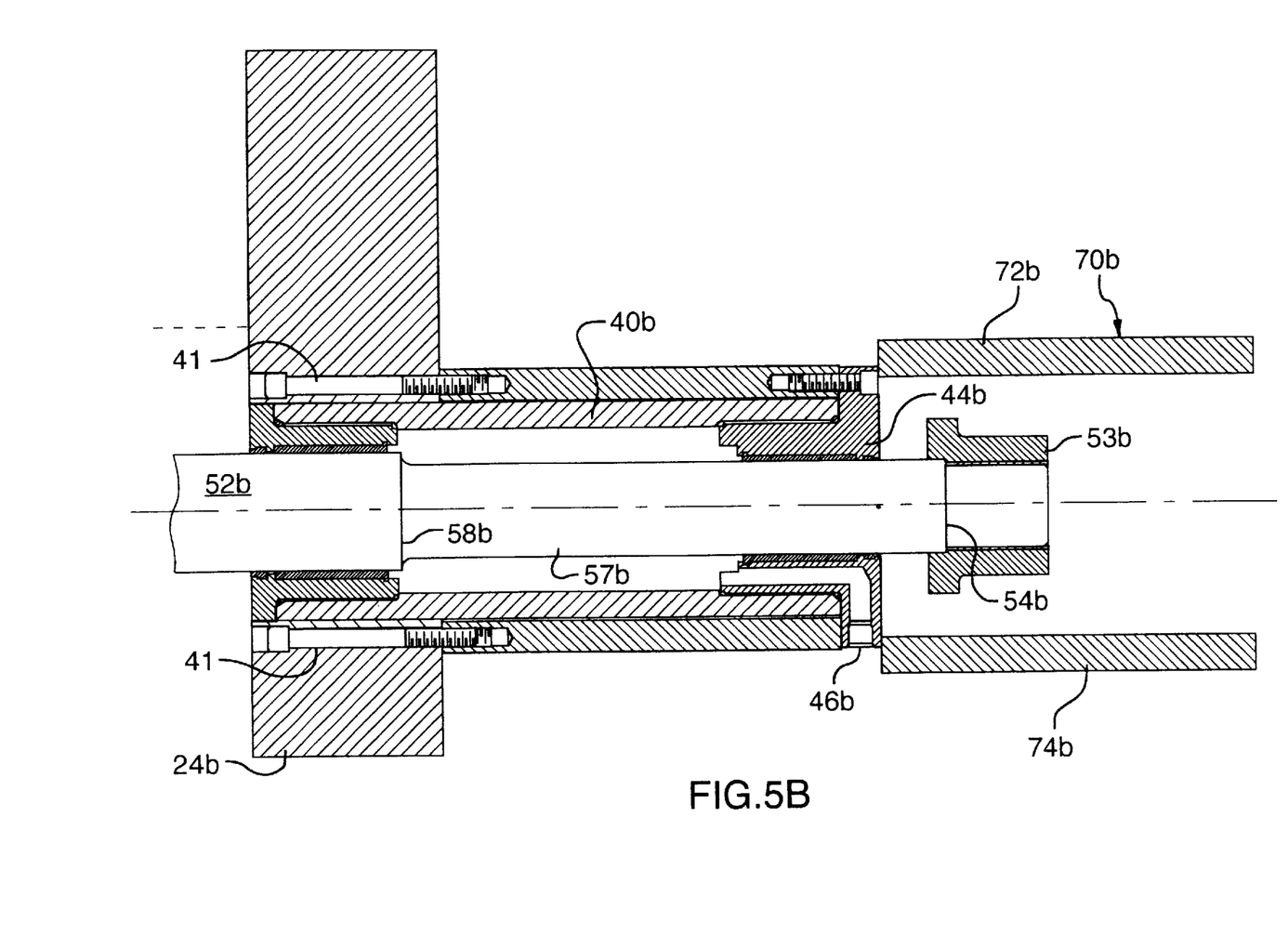
FIG. 5B is a cross-section of an anchoring yoke in the press of FIG. 2 showing the yoke in the release position.
Figure 6:
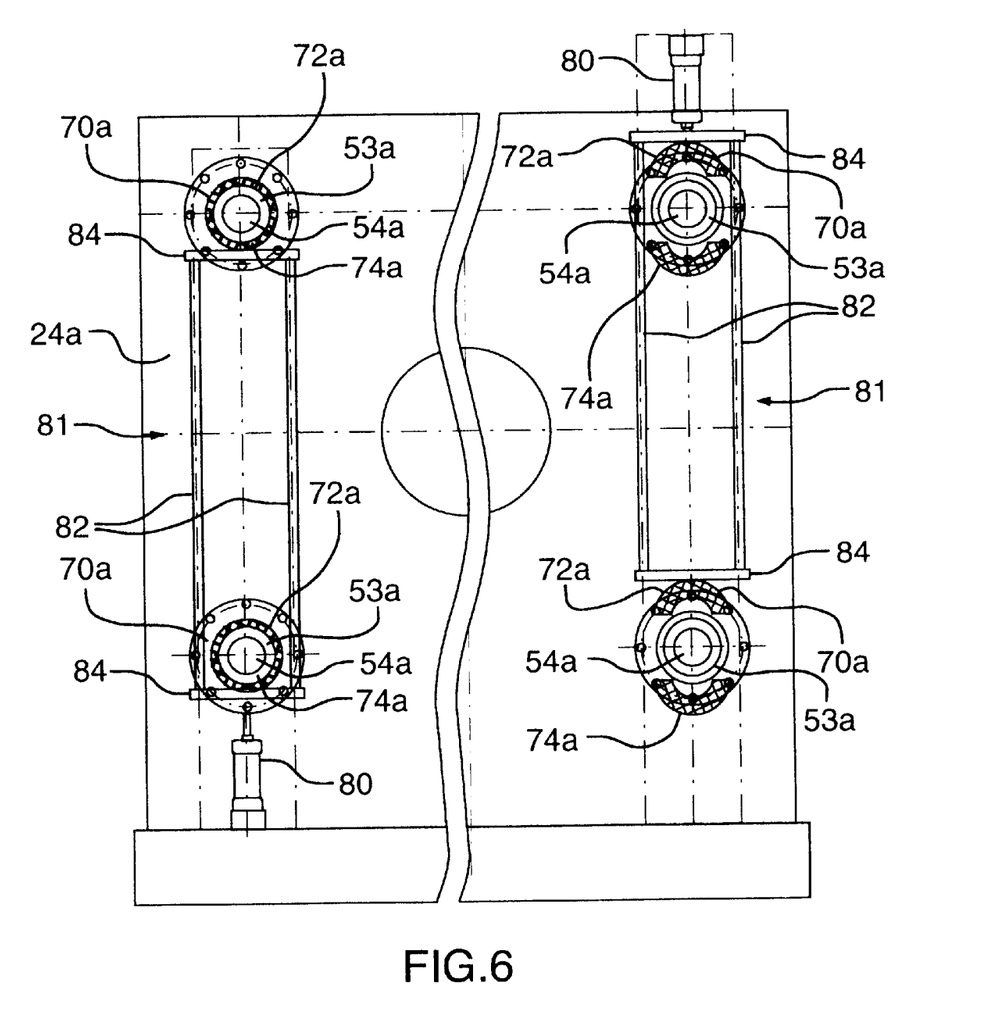
FIG. 6 is a an end elevation showing one preferred manner of actuating the anchoring yokes.

To separate the mold parts 11b, 12b and begin the clamping cycle for the mold parts 11a, 12a, hydraulic pressure is released from the ports 66b of the clamping cylinders 60 to release the clamping force from the mold 10b, which in turn releases the tension on the piston 50b, and the anchoring yokes 70b are released to free the outer ends 54b of the pistons 50b, as shown in FIG. 3B. hydraulic fluid is pumped into the ports 46b of actuating cylinders 40b, and as the hydraulic fluid intrudes into the gap 55 between the bearing surface 58b and the head assembly 44b of each piston rod 52b (as best seen in FIG. 5A), the piston rods 52b are forced out of the cylinders 40b toward the stationary platen 24a, as shown in FIG. 3C.

Figure 3D:
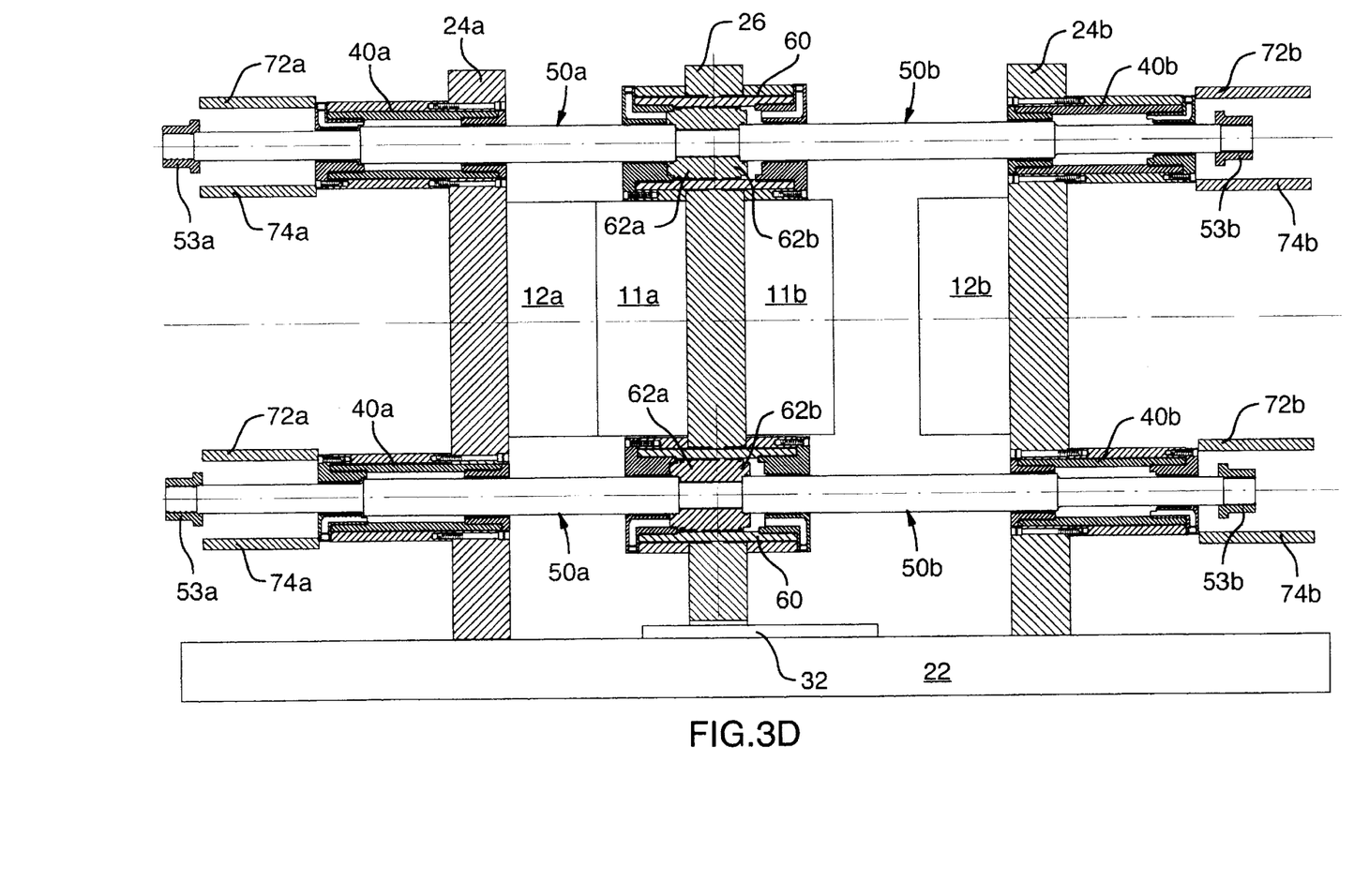
Figure 3E:
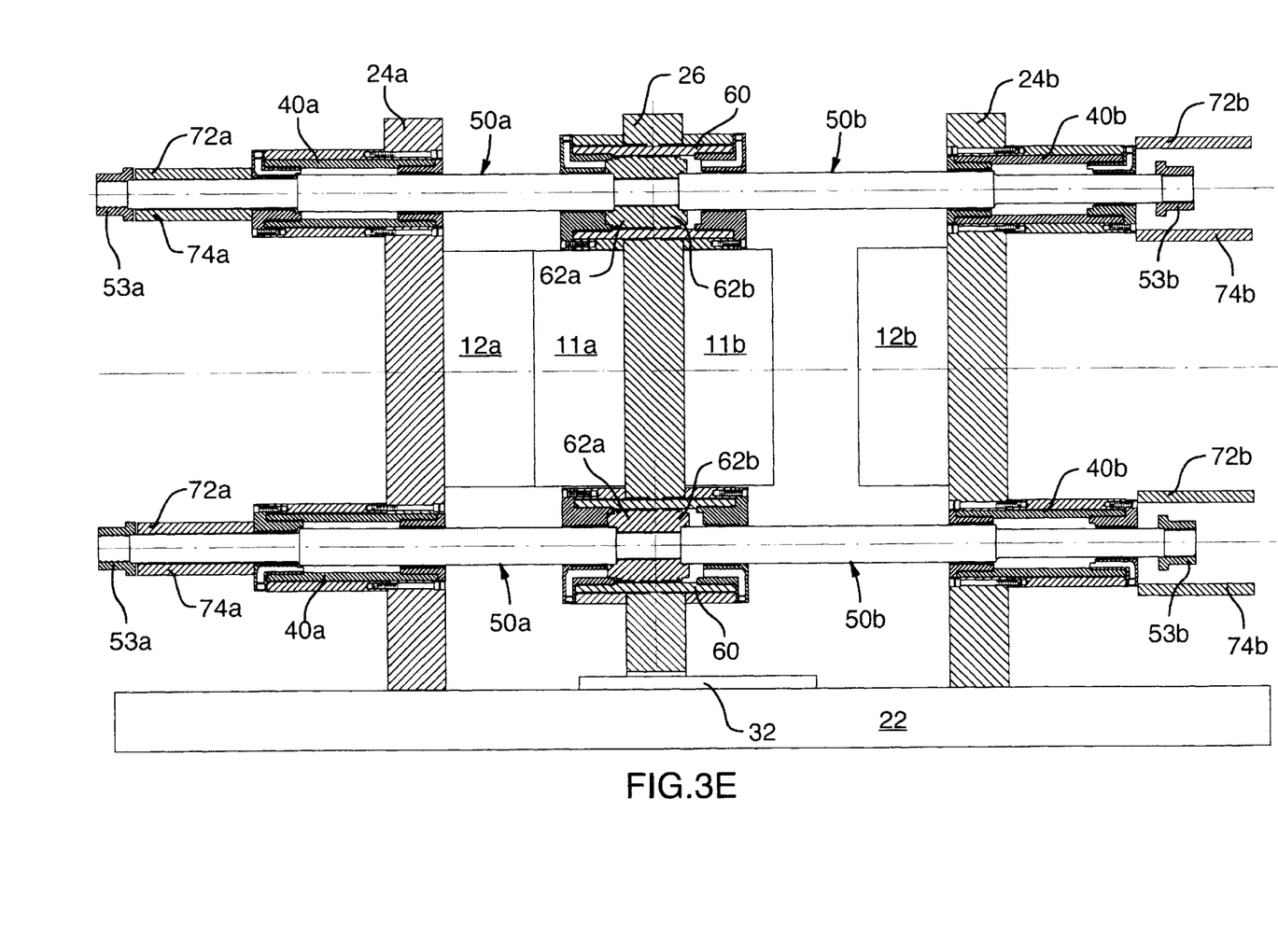

At first the piston heads 62a, 62b are forced to the opposite side of the clamping cylinder 60. As hydraulic fluid continues to be pumped into the ports 46b the pistons 50b are driven to the extended position, and the piston head 62a in contact with the end of the clamping cylinder 60 forces the moving platen 26 away from the stationary platen 24b and toward the stationary platen 24a to the clamping position, as shown in FIG. 3D. This simultaneously separates the mold parts 11b, 12b and closes the mold parts 11a, 12a, and forces the pistons 50a to retract into the cylinders 40a.

The yokes 70a are then closed to the anchoring position, as shown in FIG. 3E. This spaces the anchoring caps 53a from the actuating cylinders 40a to anchor the outer ends 54a of the pistons 50a. In the preferred embodiment, the anchoring caps 53a are spaced slightly from the yokes 70a at this stage (see gap 57 in FIG. 5A), so that the yokes 70a have room to close between the anchoring cap 53a and the cylinder 40a.

Figure 3F:
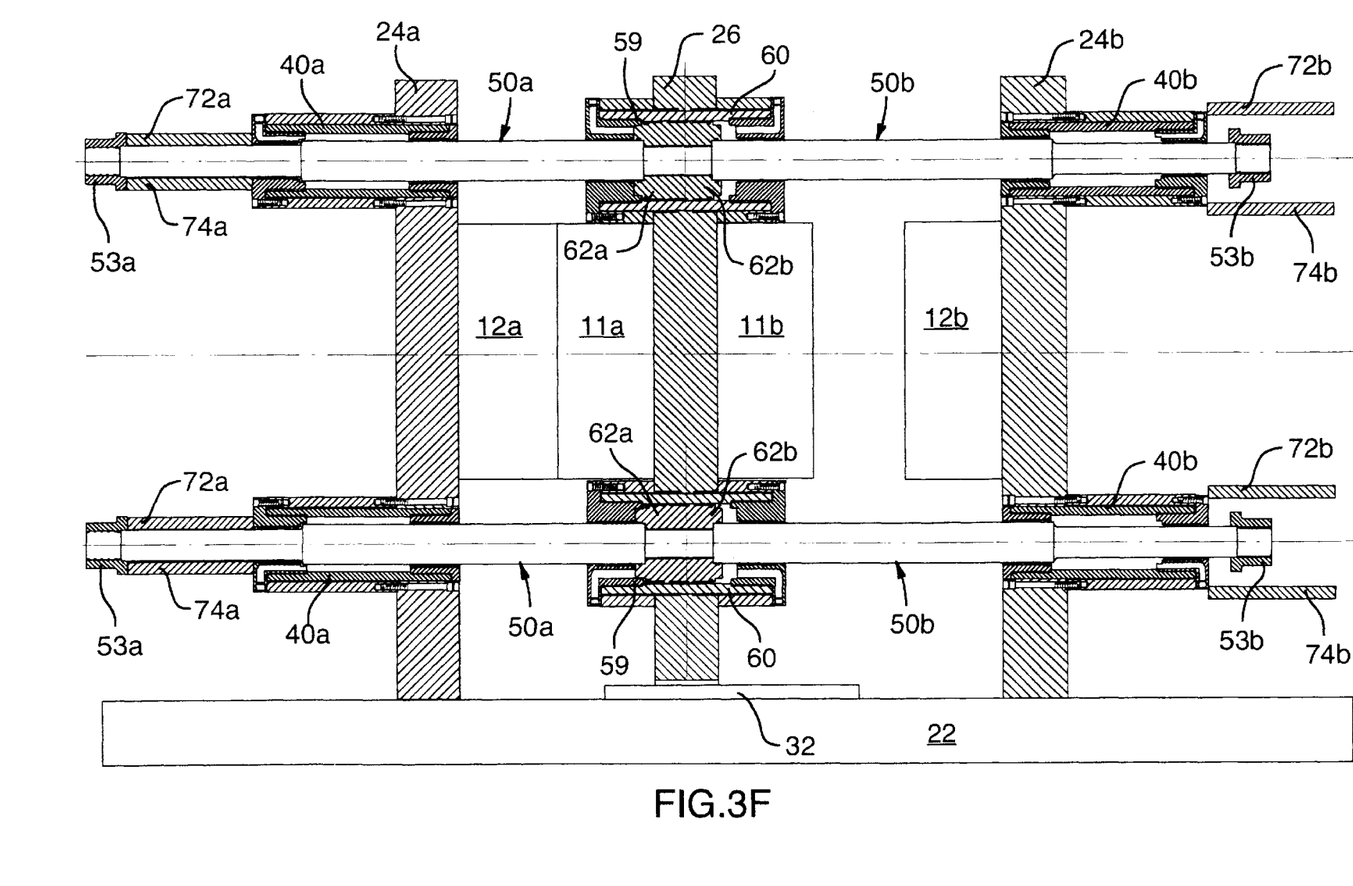
Figure 4:
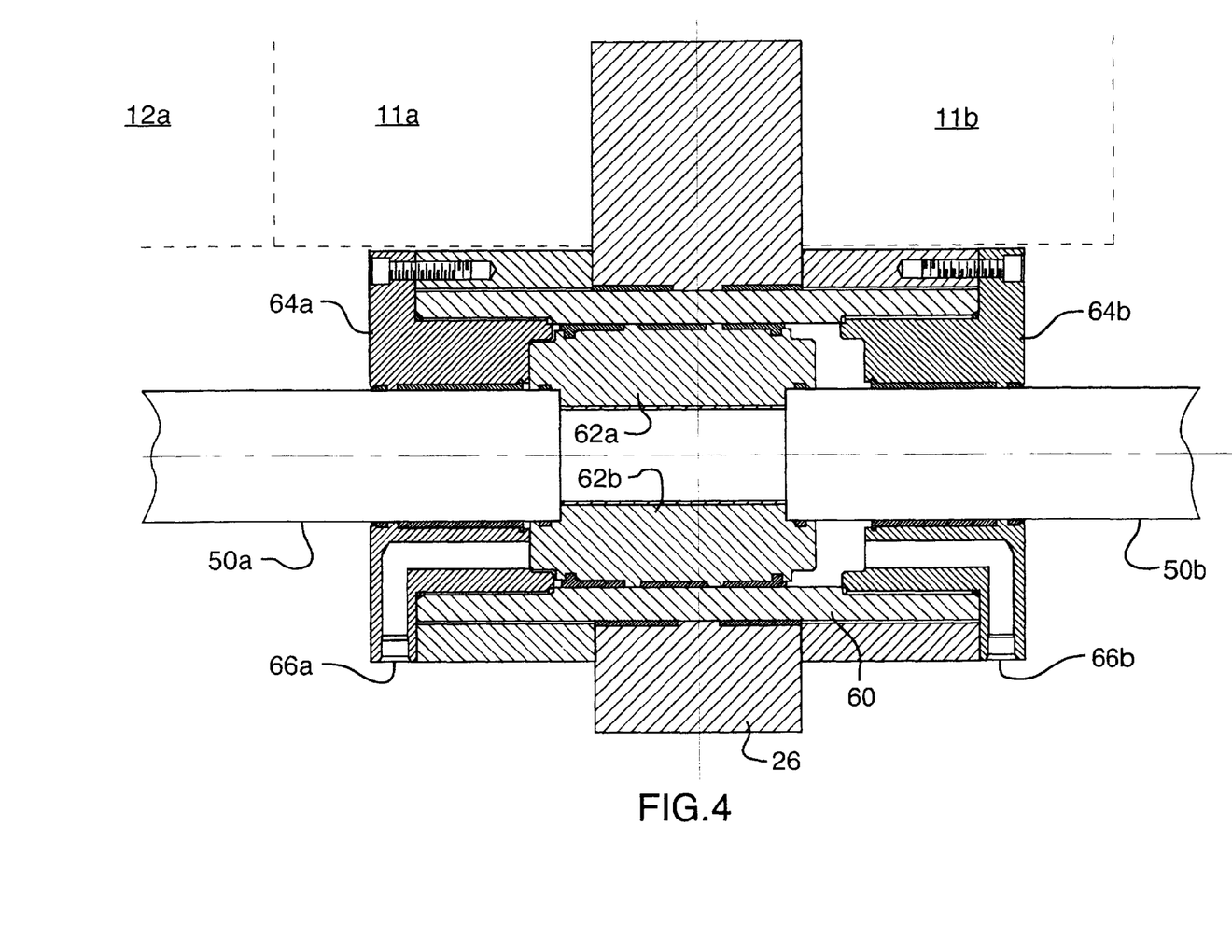
FIG. 4 is a cross-section of a clamping cylinder in the press of FIG. 2.

Hydraulic fluid is then pumped into the ports 66a, drawing the anchoring caps 53a snugly against the yokes 70a, which in the anchoring position prevent any substantial extension of the piston rods 52a. This is shown in FIG. 3F, in which the anchoring cap 53a has been drawn fully against the yoke 70a and a small gap 59 can now be seen between the clamping cylinder 60 and the piston head 62a. Since the anchoring caps 53a prevent the piston rods 52a from extending out of the cylinders 40a, so the piston heads 62a are effectively rendered stationary, as hydraulic fluid continues to be pumped into ports 64a the clamping cylinders 60 are forced toward the stationary platen 24a; since the clamping cylinders 60 are mounted in the moving platen 26, the moving platen is forced toward the stationary platen 24a to thus apply the clamping force to the mold 10a.

The mold 10a is now in the fully clamped position and the mold 24b is in the fully separated position. A molded plastic article is removed from separated mold parts 11b and 12b.

To reverse the press 20 the steps described above are repeated in the same order but in relation to the counterpart components on the other side of the press 20: To separate the mold parts 11a, 12a and begin the clamping cycle for the mold parts 11b, 12b, hydraulic pressure is released from the ports 64a of the clamping cylinders 60, releasing the clamping force from the mold 10a, and the anchoring yokes 70a are released from the outer end 54a of each piston 50a. Hydraulic fluid is pumped into the ports 46a of actuating cylinders 40a, first forcing the piston heads 62a, 62b toward the stationary platen 24b as the piston rods 52a are forced out of the cylinders 40a, and ultimately driving the moving platen 26 away from the stationary platen 24a and toward the stationary platen 24b to the clamping position. This simultaneously separates the mold parts 11a, 12a and closes the mold parts 11b, 12b, and retracts the pistons 50b into the cylinders 40b. The yokes 70b are closed to the anchoring position, anchoring the outer ends 54b of the pistons 50b. Hydraulic fluid is then pumped into the ports 66b in the clamping cylinders 60, drawing the anchoring caps 53b snugly against the yokes 70b and then, as the piston heads 62a, 62b can no longer move laterally, forcing the cylinders 60 and thus the moving platen 26 toward the stationary platen 24a to the clamping position shown in FIG. 3A.

The tandem embodiment of the invention as illustrated provides a number of advantages. The ability to clamp molds 10a, 10b on both sides of the moving platen 26, which itself effectively reduces the clamping cycle by half, also allows the stroke length of the pistons 50a, 50b to be shorter than in a conventional press 20. This reduces the clamping cycle even further and thus increases the speed and capacity of the press 20, but also allows the actuating cylinders 40a, 40b to occupy the space around the injection molding apparatus 2, requiring very little additional space for the overall apparatus.

Also, since the actuating cylinders 40a, 40b need only move the platen they can be designed to operate at higher speeds than conventional high pressure actuating cylinders, so most of the clamping cycle occurs at high speed. Moreover, since the moving platen 26 does not have to slide along any guide bar structure, the design of the platen 26 and the hydraulic cylinders 40 is considerably simplified, the need for a spider is eliminated and the durability of the connections between the platens is substantially increased.

Preferred embodiments of the invention having been thus described by way of example only, it will be apparent to those skilled in the art that certain modifications and adaptations may be made without departing from the scope of the invention, as set out in the appended claims. The invention is intended to include all such modifications and adaptations as fall within the scope of the appended claims.

We claim:

1. A press, comprising
   a stationary frame comprising a first stationary platen having a working face and a second stationary platen having a working face, disposed in opposition to the first stationary platen, and
   a moving frame comprising a moving platen disposed between the first and second stationary platens and in alignment therewith, having a first working face in opposition to the working face of the first stationary platen and a second working face in opposition to the working face of the second stationary platen, movable between the first and second stationary platens so as to alternately apply a clamping force to the working face of the first stationary platen and to the working face of the second stationary platen, and
   an actuator for moving the moving platen between the first and second stationary platens comprising a plurality of hydraulic actuating cylinders mounted about each stationary platen, for respectively actuating a plurality of pistons disposed within the actuating cylinders, and engaged to piston heads disposed within hydraulic clamping cylinders mounted to the moving platen.

2. The press of claim 1 in which the clamping cylinders have a larger bore diameter than the bore diameter of the actuating cylinders to thus apply a relatively higher clamping force to the moving platen after the actuating cylinders have moved the moving platen to a clamping position.

3. The press of claim 2 in which the pistons each comprise an enlargement at an outer end thereof projecting beyond the respective actuating cylinder, the press further comprising a movable spacer movable between an anchoring position in which the spacer substantially prevents the enlargement from approaching the actuating cylinder and thus prevents the piston from moving to an extended position, and a release position in which the spacer is removed from the path of the enlargement to thus permit the piston to move to the extended position.

4. The press of claim 3 in which in a fully retracted position the enlargement is initially spaced from the spacer, and the enlargement is drawn against the spacer by activation of the clamping cylinder.

5. The press of claim 4 in which the spacer comprises a yoke having two curved portions moved by a frame engaged to an actuator.

6. The press of claim 2 in which each piston comprises a constricted portion providing a bearing surface disposed within the actuating cylinder which reacts against pressurized hydraulic fluid to force the piston to an extended position.

7. The press of claim 1 in which at least one injection molding apparatus is disposed adjacent a stationary platen for injecting a molten thermoplastic material into a mold comprising mold parts respectively mounted on opposed working faces of the moving platen and the stationary platen.

8. The press of claim 7 in which mold parts are respectively mounted on both working faces of the moving platen and both stationary platens and comprising an injection molding apparatus adjacent to each stationary platen.

9. An injection molding apparatus for injecting a molten thermoplastic material into a mold comprising mold parts for respectively mounting on opposed working faces of a press, the press comprising
   a stationary frame comprising a first stationary platen having a working face and a second stationary platen having a working face, disposed in opposition to the first stationary platen, and
   a moving frame comprising a moving platen disposed between the first and second stationary platens and in alignment therewith, having a first working face in opposition to the working face of the first stationary platen and a second working face in opposition to the working face of the second stationary platen, movable between the first and second stationary platens so as to alternately apply a clamping force to the working face of the first stationary platen and to the working face of the second stationary platen, and an actuator for moving the moving platen between time first and second stationary platens comprising a plurality of hydraulic actuating cylinders mounted about each stationary platen, for respectively actuating a plurality of pistons disposed within the actuating cylinders, and engaged to piston heads disposed within hydraulic clamping cylinders mounted to the moving platen.

10. The injection molding apparatus of claim 9 in which the clamping cylinders have a larger bore diameter than the bore diameter of the actuating cylinders to thus apply a relatively higher clamping force to the moving platen after the actuating cylinders have moved the moving platen to a clamping position.

11. The injection molding apparatus of claim 10 in which the pistons each comprise an enlargement at an outer end thereof projecting beyond the respective actuating cylinder, the press further comprising a movable spacer movable between an anchoring position in which the spacer substantially prevents the enlargement from approaching the actuating cylinder and thus prevents the piston from moving to an extended position, and a release position in which the spacer is removed from the path of the enlargement to thus permit the piston to move to the extended position.

12. The injection molding apparatus of claim 11 in which in a fully retracted position the enlargement is initially spaced from the spacer, and the enlargement is drawn against the spacer by activation of the clamping cylinder.

13. The injection molding apparatus of claim 12 in which the spacer comprises a yoke having two curved portions moved by a frame engaged to a actuator.

14. The injection molding apparatus of claim 10 in which each piston comprises a constricted portion providing a bearing surface disposed within the actuating cylinder which reacts against pressurized hydraulic fluid to frame the piston to a extended position.

* * * * *